US010896452B2

(12) United States Patent
Dominguez et al.

(10) Patent No.: US 10,896,452 B2
(45) Date of Patent: Jan. 19, 2021

(54) USER ENHANCED AUTHENTICATION SYSTEM FOR ONLINE PURCHASES

(71) Applicant: Visa International Service Association, San Francisco, CA (US)

(72) Inventors: Benedicto Dominguez, San Bruno, CA (US); Douglas Fisher, Mountain View, CA (US); Julie Chan, Foster City, CA (US)

(73) Assignee: Visa International Service Association, San Francisco, CA (US)

(*) Notice: Subject to any disclaimer, the term of this patent is extended or adjusted under 35 U.S.C. 154(b) by 756 days.

(21) Appl. No.: 15/445,578

(22) Filed: Feb. 28, 2017

(65) Prior Publication Data

US 2017/0193511 A1    Jul. 6, 2017

Related U.S. Application Data

(60) Division of application No. 14/069,107, filed on Oct. 31, 2013, now Pat. No. 9,996,864, which is a
(Continued)

(51) Int. Cl.
*G06Q 30/06* (2012.01)
*G06Q 20/40* (2012.01)
(Continued)

(52) U.S. Cl.
CPC ......... *G06Q 30/0609* (2013.01); *G06Q 20/34* (2013.01); *G06Q 20/40* (2013.01);
(Continued)

(58) Field of Classification Search
CPC .............................................. G06Q 30/00–08
See application file for complete search history.

(56) References Cited

U.S. PATENT DOCUMENTS

| 5,793,028 A | 8/1998 | Wagener et al. |
| 5,826,245 A | 10/1998 | Sandberg-Diment |

(Continued)

FOREIGN PATENT DOCUMENTS

| EP | 1134707 A1 | 9/2001 |
| WO | 2000/045349 A1 | 8/2000 |
| WO | 2008/115620 A2 | 1/2008 |

OTHER PUBLICATIONS

Power to the People: Do it Yourself Content Distribution Salz, Peggy Anne. EContent: Jun. 2005; 28,6 ProQuest Central. p. 36. Retrieved via ProQuest on Jul. 24, 2013.
(Continued)

*Primary Examiner* — Michael Misiaszek
(74) *Attorney, Agent, or Firm* — Kilpatrick Townsend & Stockton LLP (57) ABSTRACT

Embodiments of the invention are directed to methods, systems, devices and computer-readable media. In embodiments of the invention, a user is authenticated using an authentication process that is capable of authenticating a user using an inline authentication form that can authenticate a consumer without transferring a session maintained by a merchant. The inline authentication form is used if the components of the authentication system are capable of supporting an inline authentication form. If the components of the system cannot support an inline authentication form, a different authentication process is used. In one embodiment, an inline authentication form is presented to the user asynchronously. This inline authentication form may be presented within an iFrame embedded in a merchant's checkout page after verifying that the components to be used during the authentication can support the inline authentication form.

20 Claims, 8 Drawing Sheets

Related U.S. Application Data continuation of application No. 12/606,522, filed on Oct. 27, 2009, now Pat. No. 8,612,305.

(60) Provisional application No. 61/110,425, filed on Oct. 31, 2008.

(51) Int. Cl.
*G06Q 50/26* (2012.01)
*G06Q 20/34* (2012.01)

(52) U.S. Cl.
CPC ....... *G06Q 20/409* (2013.01); *G06Q 20/4014* (2013.01); *G06Q 30/06* (2013.01); *G06Q 30/0601* (2013.01); *G06Q 30/0603* (2013.01); *G06Q 50/265* (2013.01)

(56) References Cited

U.S. PATENT DOCUMENTS

| | | | |
|---|---|---|---|
| 5,903,721 A | 5/1999 | Sixtus | |
| 5,903,878 A | 5/1999 | Talati et al. | |
| 6,247,129 B1 | 6/2001 | Keathley et al. | |
| 6,270,011 B1 | 8/2001 | Gottfried | |
| 6,327,578 B1 | 12/2001 | Linehan | |
| 6,477,578 B1 | 11/2002 | Mhoon | |
| 6,505,171 B1 | 1/2003 | Cohen | |
| 6,560,581 B1 | 5/2003 | Fox | |
| 6,632,248 B1 | 10/2003 | Isaac | |
| 6,675,153 B1 * | 1/2004 | Cook | G06Q 20/02 705/64 |
| 7,007,840 B2 | 3/2006 | Davis | |
| 7,051,002 B2 | 5/2006 | Keresman | |
| 7,225,156 B2 | 5/2007 | Fisher | |
| 7,249,093 B1 | 7/2007 | King | |
| 7,318,048 B1 | 1/2008 | King | |
| 7,356,502 B1 | 4/2008 | LaBadie et al. | |
| 7,363,257 B2 | 4/2008 | Kunz | |
| 7,366,695 B1 | 4/2008 | Allen-Rouman | |
| 7,431,207 B1 | 10/2008 | Neemann et al. | |
| 7,685,631 B1 * | 3/2010 | Paya | H04L 9/3271 726/27 |
| 2001/0042051 A1 | 11/2001 | Barrett et al. | |
| 2002/0162027 A1 | 10/2002 | Itwaru | |
| 2003/0130955 A1 | 7/2003 | Hawthorne | |
| 2004/0210536 A1 | 10/2004 | Gudelj | |
| 2005/0015304 A1 | 1/2005 | Evroni | |
| 2005/0102234 A1 | 5/2005 | Devine | |
| 2007/0006286 A1 | 1/2007 | Singhal | |
| 2007/0094097 A1 | 4/2007 | Owurowa et al. | |
| 2007/0100770 A1 | 5/2007 | Grinberg | |
| 2007/0226137 A1 | 9/2007 | King | |
| 2008/0034428 A1 | 2/2008 | Bejar | |
| 2008/0046723 A1 | 2/2008 | Weber | |
| 2008/0046968 A1 | 2/2008 | Cline | |
| 2008/0097925 A1 | 4/2008 | King | |
| 2008/0183593 A1 | 7/2008 | Dierks | |
| 2008/0208761 A1 | 8/2008 | Autry | |
| 2009/0100505 A1 * | 4/2009 | Shaty | G06F 21/50 726/3 |
| 2009/0240594 A1 | 9/2009 | Kerner et al. | |
| 2010/0100725 A1 | 4/2010 | Ozzie et al. | |
| 2010/0115594 A1 | 5/2010 | Paya et al. | |

OTHER PUBLICATIONS

Search/Examination Report dated May 24, 2010 from International Patent Application No. PCT/US2009/062480, 11 pages.

Non-Final Office Action dated Apr. 6, 2020 for U.S. Appl. No. 15/956,568, 9 pages.

"Digital Courier Announces Partnership With Inline's iHTML Merchant 2.04 to offer Enhanced E-Commerce Solution", PR Newswire, Feb. 2000, 3 pages.

Notice of Allowance dated Oct. 28, 2020 for U.S. Appl. No. 15/956,568, 6 pages.

* cited by examiner

Shopping Cart Thank You - Microsoft Internet Explorer Provided by Inovant

File  Edit  View  Favorites  Tools  Help

Back ▸ | Search  ☆ Favorites | ⊠ ▸ 🖶 ▸ 📄 🔖 🐝

Address 🔗 C:\Documents and Settings\JuChan\My Documents\Andow\vbv UI Enhancements\Final ▸ | Go  Links »

| Shopping Cart | Shipping & Payment | Confirmation |

Thank you!

Your purchase was successful. Your order number is AXIQ1996
You will receive an email confirmation shortly. Please print and save this receipt for reference.
If you have questions of concerns about your order, please contact Customer Service at 1-800-999-7878.

| Order Summary | | | | |
|---|---|---|---|---|
| Description | Quantity | Unit Price | Savings | Item Total |
| Big Screen Monitor<br>XLM4IU-006872<br>Usually ships in 1-2 business days | 1 | $2199.00 | $100.00 | $2099.00 |
| My Dream Laptop<br>PPM4IU-00600S<br>Usually ships in 1-2 business days | 1 | $1899.00 | $100.00 | $1799.00 |

Subtotal                $3898.00
Shipping                   $0.00
Sales Tax                $373.83
Recycling Fee             $12.00
Discounts              ($200.00)
PURCHASE AMOUNT        $4283.83

PAID by VISA           $4283.83
XXXX-XXXX-XXXX-1234

My Computer

USER ENHANCED AUTHENTICATION SYSTEM FOR ONLINE PURCHASES

CROSS-REFERENCES TO RELATED APPLICATIONS

The present application is a divisional of U.S. patent application Ser. No. 14/069,107, filed Oct. 31, 2013, which is a continuation application of U.S. patent application Ser. No. 12/606,522, filed Oct. 27, 2009, which is a non-provisional of and claims the benefit of priority under 35 U.S.C. § 119 from U.S. Provisional Patent Application Ser. No. 61/110,425, entitled "User Authentication System for Online Purchases," filed on Oct. 31, 2008, the disclosure of which is hereby incorporated by reference in its entirety for all purposes.

BACKGROUND

Electronic commerce cards are frequently used by consumers to make purchases from merchants over the Internet. Electronic commerce cards include credit cards, debit cards, prepaid purchase cards, travel cards, or any other system that can be used instead of cash to purchase goods or services. Electronic commerce cards do not necessarily have to be in the form of a physical card in order for an account associated with an electronic commerce card to be used to conduct transactions. To prevent fraud, electronic commerce card associations and/or issuers have instituted authentication systems to ensure that electronic commerce cards are only used by authorized consumers. One example of an authentication system enables a consumer to associate a password or other identifying information with an electronic commerce card. To make a purchase online, the consumer must provide the password associated or other identifying information with the electronic commerce card. This ensures that the person possessing the electronic commerce card is actually authorized to use the electronic commerce card.

Typical authentication systems use a decentralized, distributed computing model in which information is exchanged between merchants, electronic commerce card issuers and the card association to authenticate consumers. With thousands of card issuers and millions of merchants using a typical card processing system, deploying an authentication system among so many different entities is a difficult task. Additionally, merchants are reluctant to include authentication functions if the authentication system is only supported by a small number of card issuers.

One common problem faced by many authentication systems is how to authenticate a user using a form served from an authentication site managed by an issuer of the payment account while maintaining an online session between the user and a merchant's site.

Original authentication system designs typically used a pop-up window to authenticate the user. These windows were often driven by Javascript with static URLs as a backup. The pop-up window had separate Issuer SSL credentials, and they frequently had no address bar. The merchant would open a pop-up window and direct the pop-up window to open a page served from a server separate from a merchant's server. The pop-up window would contain a form that would be filled out by the user. After the form was completed, a returning POST command instructed the merchant's page to close the pop-up window. The original payment page could then be processed by the merchant to charge the payment account to complete the transaction.

As internet technology developed, pop-up killers began to be used in web browsers, and consequently pop-up methods become difficult to reliably execute. As a result, the design of authentication systems was changed to use a different process. In the new process, the screens that were previously shown using a pop-up window were now presented to the user in place of the merchant's checkout page in the main browser window. As a result, the merchant page's disappeared from the user's view while the online authentication form was being completed. The underlying infrastructure of the authentication system did not have to be significantly changed to accommodate this new process, because the only items in the system that had to be change were the templates used by merchants and issuers to present the authentication pages.

Both of these prior methods presented some problems for merchants and for consumers. In some instances, consumers would feel less secure about the authentication process because they had to navigate away from the merchant's website. As a result, the consumer could no longer see their order and sometimes the consumers would be confused as to why their browser navigated away from the merchant's site. In some instances, if a consumer decided that he or she was uncomfortable with the redirection, the consumer might abandon the order and the merchant might lose a sale. Another problem is that authentication processes that navigate away from the merchant's checkout page can sometimes lose track of the online session tracking the user's transaction. As a result, the user's shopping cart of items could be lost. Consequently, the consumer would have to recreate his or her shopping cart in a new session. A consumer might not want to go through this hassle. The consumer might also lose confidence in the online system. In either case, a sale by the merchant could be lost.

Authentication systems such as the ones just described also frequently involve many different parties managing different pieces of hardware and software that all need to work together to successfully authenticate users. For example, a merchant, a credit card issuer, and a payment processing entity may all operate servers running software that needs to communicate with each other in order to successfully authenticate a user conducting an online transaction. Upgrading a distributed system such as this can sometimes be difficult since no single party controls all of the components that need to be upgraded in order to implement new functionality. Consequently, as components of authentication systems have been modified over time, many of the components of the system are running different versions of the authentication system. Some of these versions may not be fully compatible with each other. It may not be practical to upgrade all components in the authentication system to an appropriate version at the same time, because many of the components of the system are managed by separate entities. One potential problem with the varying versions of components in a deployed authentication system is that if an unsupported authentication protocol is used, then the authentication request may fail somewhere during the authentication process and the user may potentially lose the online session of the user at the merchant's site.

Embodiments of the invention are directed toward solving these and other problems.

BRIEF SUMMARY

Embodiments of the invention are, without limitation, directed to methods, systems, devices and computer-readable media.

One method for authenticating a user conducting a transaction comprises receiving an asynchronous authentication request from a client application and determining whether the authentication request can be handled in an inline form without transferring a client session. If the request can be handled without transferring the client session, an inline authentication form is sent to the client. The inline authentication form is capable of authenticating a user without navigating away from the client session. If the request cannot be handled without transferring the client session, a traditional authentication form is sent to the client. Either form is capable of authenticating a consumer.

According to one embodiment, a merchant server comprising a processor and a computer readable medium execute an authentication method. The computer readable medium has a computer readable code embodied therein, and the computer readable code is adapted to be executed on the processor. The computer readable code is further adapted to be executed to implement an authentication method. A merchant checkout page is sent to the consumer. The merchant checkout page is configured to receive from the merchant server an indication of whether the issuer server is configured to authenticate the consumer using an inline authentication form. The authentication method sends an enrollment verification request to a directory server. An enrollment verification response is then received from the directory server. The enrollment verification response includes an indication of whether an issuer server that is capable of authenticating a consumer conducting an online transaction is configured to authenticate the consumer using an inline authentication form. The merchant checkout page is also configured to send an authentication request message to the issuer server. The authentication request message includes an indication of whether the merchant checkout page is configured to support the inline authentication form when the issuer server is configured to authenticate a consumer using the inline authentication form.

According to another embodiment, a directory server comprising a processor and a computer readable medium execute an authentication method. The computer readable medium has a computer readable code embodied therein, and the computer readable code is adapted to be executed on the processor. The computer readable code is further adapted to be executed to implement an authentication method. The authentication method receives an enrollment verification request from a merchant server. An issuer server that can be used to authenticate a consumer conducting the online transaction is then determined. The directory server then communicates with the issuer server to determine whether the issuer server is capable of authenticating the consumer using an inline authentication form. The directory server then sends an enrollment verification response to the merchant server. The enrollment verification response includes an indication of whether the issuer server is capable of authenticating the consumer using the inline authentication form. The merchant server is configured to send to the consumer a merchant checkout page. The merchant checkout page is configured to receive from the merchant server an indication of whether the issuer server is configured to authenticate the consumer using the inline authentication form. The merchant checkout page is also configured to send an authentication request message to the issuer server. The authentication request message includes an indication of whether the merchant checkout page is configured to support the inline authentication form when the issuer server is configured to authenticate a consumer using the inline authentication form.

According to another embodiment, a computer readable medium comprising computer-executable code is disclosed. The computer-executable code comprises code for sending an enrollment verification request, code for receiving an enrollment verification response, wherein the enrollment verification response includes an indication of whether an issuer server is capable of authenticating a consumer using an inline authentication form. The computer-executable code also comprises code for sending an authentication request message to the issuer server, wherein the authentication request message includes an indication of whether the computer-executable code is configured to support the inline authentication form when the issuer server is configured to authenticate a consumer using the inline authentication form.

According to another embodiment, a method is disclosed in which an enrollment verification request is sent over a network from a merchant server to a directory server, an enrollment verification response is received over the network from the directory server at the merchant server, wherein the enrollment verification response includes an indication of whether an issuer server is capable of authenticating a consumer using an inline authentication form, an authentication response message is received over the network from the issuer server at the merchant server, wherein the authentication response message is sent in response to an authentication request message sent from a merchant checkout page to the issuer server, wherein the authentication request message includes an indication of whether the merchant checkout page is capable of authenticating the consumer using the inline authentication form, wherein the authentication response message includes an indication of whether the consumer was successfully authenticated by the issuer server, and an online transaction between a merchant and the consumer is conducted after the authentication response message indicates to the merchant server that the consumer has been successfully authenticated.

According to another embodiment, a method is disclosed in which an enrollment verification request is received over a network from a merchant server at a directory server, an enrollment verification response is sent over the network from the directory server to the merchant server, wherein the enrollment verification response includes an indication of whether an issuer server is capable of authenticating a consumer using an inline authentication form, wherein the issuer sever receives an authentication request message from a merchant checkout page, wherein the authentication request message includes an indication of whether the merchant checkout page is configured to authenticate the consumer using the inline authentication form, wherein the issuer server sends an authentication response message to the merchant server, wherein the merchant server conducts an online transaction between a merchant and the consumer after the authentication response message indicates to the merchant server that the consumer has been successfully authenticated.

According to another embodiment, a method is disclosed in which a payment message is sent over a network from to a merchant server from a merchant checkout page, wherein the payment message includes electronic card commerce card information and wherein the payment message includes an indication of whether the merchant checkout page is configured to support an inline authentication form, a payment message response is received from the merchant server at the merchant checkout page, wherein the payment message response includes an indication of whether an issuer server associated with the electronic card commerce card supports inline authentication, and an authentication request message is sent to the issuer server from the merchant checkout page to conduct an online transaction between a merchant and a consumer, wherein the authentication request message includes an indication of whether the merchant checkout page is configured to support the inline authentication form when the issuer server is configured to authenticate a consumer using the inline authentication form.

These and other embodiments of the invention are described in further detail below.

DETAILED DESCRIPTION

Embodiments of the invention are directed to methods, systems, devices and computer-readable media. In embodiments of the invention, a user is authenticated using an authentication process without transferring a session maintained by a merchant if the components of the system are capable of supporting an inline authentication form. If the components of the system cannot support an inline authentication form, a different authentication process is used. In one embodiment, an inline authentication form is presented to the user asynchronously. This inline authentication form may be presented within an iFrame embedded in a merchant's checkout page after it is verified that the components to be used during the authentication can support the inline authentication form.

As used herein, "HTML" can refer to a standard static web page. An HTML page is served to a client from a server, and the HTML page is rendered by the client. Typically, the content of an HTML page is static. In other words, the content does not change once the page is rendered by a client.

As used herein, "DHTML" can refer to dynamic content on browser that is added to an HTML page. Dynamic content allows some of the logic behind the web page to be contained within a client browser. Many different technologies can be used to create the dynamic content, including javascript, CSS, etc.

As used herein, "iFrames" can refer to an HTML object. Like the earlier 'Frames' technology, iFrames can open a web page inside the same window as another page. iFrames are more flexible and allow for greater functionality than Frames. As technology continues to develop, new mechanisms may be created that offer functionality similar to what is offered by iFrames. These new mechanisms may also be used according to various embodiments.

As used herein, "inline" can refer to a process or form that is presented within web page being viewed by a user, without requiring the user to navigate away from the web page, regardless of the source of the inline form or process. For example, a user may be viewing a web page from a first source, and the web page may open an inline form, such as by using an iFrame. The inline form may appear on top of the web page. Although the web page may still remain visible, only the content within the iFrame will be active, which means the only clickable portion of the screen will be within the iFrame. The content provided in the inline form may come from a second source, however to the user it does not appear as if he has navigated away from the page that was initially being viewed. Once any inputs or actions needed by the inline form have been completed, the inline form may be closed, and the web page once again becomes active. In the well known language of user interface design, the inline form is like a modal child window of the parent web page. Until the child window is dismissed, the parent web page remains inaccessible, although still visible.

As used herein, "session" can refer to interactions between a user and a web page provided by a server. While the user is viewing the web page, the session is active. If the user navigates or is directed away from the web page to a different web page provided by a different server, the session is said to be transferred. For example, a session may comprise a user viewing a web page from a first server. The first server may open an inline iFrame on the web page, with the content of the iFrame provided by a second server. Because the user is not directed away from the first web page, the session is not transferred. On the other hand, if a web page redirects the user to a different web page, the session will be referred to as transferred. For purposes of this disclosure, a non-inline popup window will also be deemed as causing a session to be transferred.

As used herein, "Javascript" can refer to the well-known and widely supported browser scripting language.

As used herein, "Ajax" can refer to a broad group of web technologies that can be used to implement a web application that communicates with a server asynchronously. In other words, the web application can communicate with a server in the background, without interfering with the current state of the page. Ajax requests can be handled by any combination of operating systems, web servers, application servers, etc.

As used herein, "Issuer" can refer to any suitable entity that may open and maintain an account associated with consumer. Some examples of issuers may be a bank, a business entity such as a retail store, or a governmental entity. In many cases, issuer may also issue an electronic commerce cards to consumer. The issuer typically has an established relationship with the consumer and therefore has data that can be used to authenticate the consumer. Such data may include the consumer's social security number, birthday, account number, shipping address, preferences, etc.

As used herein, a "server" is typically a powerful computer or cluster of computers. For example, a server may be a large mainframe, a minicomputer cluster, or a group of servers functioning as a unit. In one example, a server may be a database server coupled to a web server. Moreover, a server can behave as a single computer, which services the requests of one or more client computers or portable electronic devices.

As used herein, in some embodiments, a "Merchant Server" is a server used to provide an online storefront for consumers to shop and also to conduct online transactions with consumers once the consumers have decided to purchase goods from the merchant.

As used herein, in some embodiments, a "Merchant Plug-In" (or "MPI") is a component that performs various authentication functions on behalf of the merchant. The merchant plug-in may be embodied by suitable hardware and/or software that are accessible to a merchant. For example, the MPI may be software running on the Merchant Server or it may be a component run on a different server accessible by the merchant. The MPI may be able to perform functions such as determining whether authentication is available for a card number, validating a digital signature in an authentication message, and other functions.

As used herein, in some embodiments, an "Access Control Server" (or "ACS") provides issuers, or other entities capable of authenticating a consumer conducting an online transaction, with the ability to authenticate consumers during an online transaction. An ACS performs the requested authentication services and provides digitally signed responses to entities requesting authentication. An ACS may be shared by multiple parties. Alternatively, a party may have multiple access control servers, each associated with a different subset of the consumers.

As used herein, in some embodiments, a "Directory Server" can be used to route messages containing enrolment and authentication information between a merchant plug-in (MPI) and issuers ACS. The directory server can also determine whether a consumer can utilize the authentication services. In some embodiments, the directory server can be operated by a service organization such as Visa.

The embodiments described herein make use of the above terms to describe the steps taken. One skilled in the art will recognize that many other technologies can be used to accomplish the steps described herein, and the present description is not meant to be limiting to any particular technology. For example, although not described here, technologies such as PHP, ASP, other HTML/DHTML elements, etc. can all be used in various embodiments. Alternative embodiments may also add to or omit some of the steps or entities described below.

Figure 1:
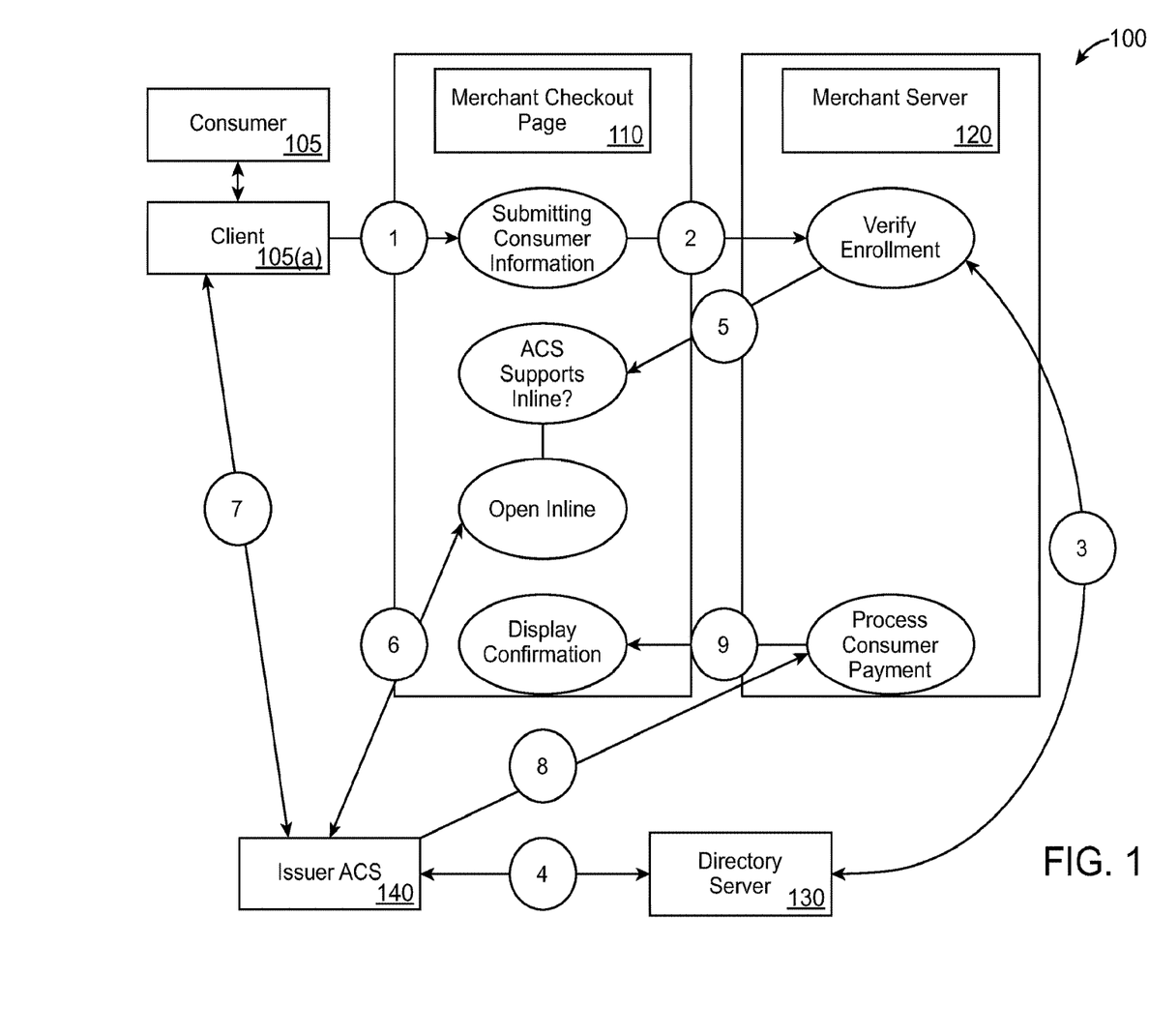
FIG. 1 shows a diagram of the components used and the dataflow between those components according to one embodiment.

FIG. 1 illustrates the components of decentralized card processing system 100 and data flow between those components. System 100 enables consumers 105 to be authenticated while making online electronic commerce card purchases with a merchant.

Consumer 105 initiates an online purchase by accessing a merchant checkout page 110 served by a merchant server 120. The merchant checkout page is an interface displayed to the consumer on a client while the consumer is attempting to conduct a transaction. According to some embodiments, the merchant server 120 comprises a processor and a computer readable medium having a computer readable code embodied therein, wherein the computer readable code is adapted to be executed on the processor, wherein the computer readable code is adapted to be executed to implement the method outlined in FIG. 1. In some embodiments, the page 110 is a HTML/DHTML page displayed to the consumer 105 in a standard web browser running on a client 105(a). The merchant web page 110, according to some embodiments, comprises computer readable code that has been adapted to be executed to implement the method outlined in FIG. 1. The client 105(a) may be any type of communications device to access the merchant checkout page, for example a personal computer, a personal digital assistant, or a mobile telephone may all be suitable devices that can display the merchant checkout page to the consumer. In some embodiments, applications other than a web browser may be used by the card holder to view and interact with the merchant checkout page on the client. For example, a specialized application may be written that allows the consumer to conduct an online transaction with the merchant.

Typically, a consumer 105 will first select a variety of items that the consumer would like to purchase from an online merchant. Often times, the consumer will select the items to be purchased and place the items in an online shopping cart. The online shopping cart can be maintained by the merchant server through a session, as is well-known in the art. After the consumer has selected the items that the consumer wishes to purchase from the merchant, the consumer can begin the checkout process. This process often begins with the consumer submitting electronic commerce card information, such as a card number and expiration date, to a merchant server 120 via the merchant checkout page 110. The entry of information by the consumer into the merchant checkout page via the client 105(a) is represented at step 1 in FIG. 1.

Once the consumer's 105 information is entered into the merchant checkout page 110, the consumer 105 can then send the entered information to the merchant server 120. This submission of information to the merchant server 120 is shown at step 2 in FIG. 1. The consumer's information can be sent to the merchant server 120 in a variety of ways. For example, if the client 105(a) used by the consumer 105 supports Ajax functionality, then the entered information can be sent to the merchant server 120 asynchronously from the client 105(a) using the Ajax functionality. If the client 105(a) used by the consumer 105 cannot support Ajax functionality, then a form can be submitted to the merchant server 120 using more traditional HTML technology, such as a "POST" command. In various embodiments, a secure communication system, such as SSL, is used for all communications, including sending electronic commerce card information to the merchant server 120.

After the information has been submitted to the merchant server 120, the merchant server can determine whether the client 105(a) used by the consumer 105 supports inline authentication without transferring a session. In some embodiments, information that can be used to determine the abilities of the consumer's client to support inline authentication is submitted when the consumer's information is sent to the merchant server 120. For example, the merchant server 120 may be able to tell that a consumer's client 105(a) supports iFrames based on the type of browser used by the client 105(a) and the version of the browser. If the consumer's client 105(a) is not capable of supporting authentication without transferring a session, such as through the use of an iFrame, then more traditional methods (such as pop-up windows or older inline authentication processes as previously described) can be used to authenticate the consumer.

The use of these traditional methods for authentication is also referred to as the use of a standard authentication form in this disclosure. The authentication protocol that defines the messages exchanged between the merchant, consumer, and issuer may be the same regardless of whether an inline authentication form or a standard authentication form is used to authenticate the consumer. Some of the differences between an inline authentication form and a standard authentication form are in the handling of the session and in the presentation to the consumer. The data flow illustrated in FIG. 1 will continue assuming that the consumer's client supports the ability to use an inline authentication form to authenticate the consumer without transferring the session.

The merchant server 120 can then initiate an authentication procedure to determine whether the electronic commerce card information is valid and has been provided by an authorized consumer. In the embodiment illustrated in FIG. 1, there are numerous electronic commerce card issuers. Each electronic commerce card issuer is responsible for authenticating its own electronic commerce cards.

To authenticate the consumer's 105 electronic commerce card information, the merchant server 120 may locate the authentication service, if any, of the electronic commerce card issuer associated with the electronic commerce card information. A directory server 130 maintains a directory specifying the location and capabilities of all card issuer systems in the card processing system 100. The capabilities of card issuer systems include whether the card issuer system supports authentication. According to some embodiments, the directory server, similar to the merchant server 120, comprises a processor and a computer readable medium having a computer readable code embodied therein, wherein the computer readable code is adapted to be executed on the processor, wherein the computer readable code is adapted to be executed to implement the method outlined in FIG. 1.

In one embodiment, the merchant server 120 sends a verifying enrollment request (VEReq), also referred to as an enrollment verification request, to a directory server 130 to locate the appropriate card issuer system. This is shown at step 3 in FIG. 1. In some embodiments, all authentication-related communication is coordinated by an MPI integrated with the merchant server 120. The VEReq includes at least a portion of the electronic commerce card information to be used by the directory server 130 to identify the card issuer system associated with the consumer's electronic commerce card. In an embodiment, each electronic commerce card issuer is assigned a different range of electronic commerce card numbers. This embodiment of the directory server 130 includes a list of all electronic commerce card issuers and their associated electronic commerce card number ranges. By comparing the electronic commerce card information with the list of electronic commerce card issuers, the directory server 120 is able to determine the appropriate card issuer system that should be used to authenticate the consumer.

After identifying the card issuer system, the directory server 120 determines if the card issuer supports authentication. If the card issuer does not support authentication, then the authentication process stops. Otherwise, the directory server 130 forwards the VEReq to an access control server (ACS) 140 associated with the card issuer's authentication service. This is shown at step 4 in FIG. 1. The ACS 140 determines whether the card information provided in the VEReq can be authenticated. Card information may not be able to be authenticated by the ACS 140 if, for example, the card information does not include a valid electronic commerce card number, or if there is no authentication information, such as a password or other identifying information, associated with the electronic commerce card number. According to some embodiments, the issuer ACS 140, similar to the merchant server 120 and the directory server 130, comprises a processor and a computer readable medium having a computer readable code embodied therein, wherein the computer readable code is adapted to be executed on the processor, wherein the computer readable code is adapted to be executed to implement the method outlined in FIG. 1.

If the electronic commerce card information provided in the VEReq can be authenticated, the ACS 140 sends a verified enrollment response (VERes), also referred to as an enrollment verification response, back to the directory server 130. The VERes includes a message indicating that the ACS 140 can authenticate the electronic commerce card information and a pseudonym corresponding to the card number. The pseudonym can be any type of code or number that can be uniquely linked to card information by the ACS 140 at a later time. The VERes also includes a URL to be accessed by the consumer's 105 client to authenticate the consumer. The URL may contain a parameter that indicates that the issuer supports inline authentication and can authenticate the electronic commerce card without requiring the consumer to navigate away from the merchant's checkout page 110. In one embodiment, the parameter may be represented as VbV_UI_support=2.0. This parameter may indicate whether the ACS is capable of sending an inline authentication form that is intended to be served within an iFrame. For system 100, the URL is associated with a web site provided by the ACS 140. Upon receiving a VERes from the ACS 140, the directory server 130 forwards the VERes to the merchant server 120.

Next, if the request submitted by the merchant checkout page 110 was via Ajax technology, then an Ajax response can be sent to the merchant checkout page with the URL. This is shown at step 5 in FIG. 1. If the request submitted by the merchant checkout page was not via Ajax, but instead via an HTML POST or other mechanism, then the merchant checkout page can be redirected to a traditional user authentication process that uses a standard authentication form. Additionally, the response sent to the merchant checkout page can include the pseudonym created by the ACS 140 and transaction information associated with the consumer's prospective purchase. Although the response is described as being sent to the merchant checkout page, this is for simplicity of explanation. It would be understood by a person of skill in the art that the response is actually sent to the Client 105(*a*) for processing, and the results of that processing are reflected on the merchant checkout page as displayed on the client's browser. References made to the merchant checkout page performing any action should be interpreted in light of this simplification.

The merchant checkout page 110 then examines the URL received from the merchant server 120 to determine whether the ACS 140 has indicated that the ACS can support an inline authentication form. If the ACS can support an inline authentication form and the client 105(*a*) of the consumer 105 can also support an inline authentication form, then the merchant checkout page can add a parameter to the URL indicating that merchant checkout page would like the inline authentication form from the ACS. The URL can then be used by the merchant checkout page to open an inline authentication form served by the issuer. This is shown at step 6 in FIG. 1. According to some embodiments, the merchant checkout page opens an inline authentication form using an iFrame, and the URL used to provide the content of the iFrame may contain a parameter such as VbV_UI_accept=2.0 to indicate that the merchant checkout page is requesting an inline authentication form. If the ACS does not support inline authentication, then the merchant checkout page may redirect to a standard authentication form. In accessing this web site, the merchant checkout page may also supply the ACS 140 with the pseudonym originally created by the ACS for the VERes.

The ACS may respond to the page request from the merchant checkout page 110 by sending a page which is semi-transparent with a dialog box. In one embodiment, this page is served within the middle of an iFrame opened on the merchant checkout page. The dialog box may be sized to contain the appropriate content. If the user is already enrolled in an authentication program, such as Verified by Visa (VbV), then an authentication inline form can be sent. If the user is not yet enrolled in an authentication program, then an enrollment form can be sent. Displaying the content provided by the ACS within an iFrame contained on the merchant's checkout page advantageously allows for the consumer to appear to remain on the merchant's checkout page, even though the content of the iFrame is not supplied by the merchant. This may help to assure the consumer that their transaction is secure.

At step 7, the consumer 105 communicates with the Issuer ACS 140 through the inline authentication form, and follows the appropriate dialog flow directly with the Issuer ACS. The consumer authenticates his or her identity by presenting authentication information to the web site provided by the ACS. In an embodiment, the consumer authenticates her identity by providing to the ACS a password or other identifying information previously associated with the electronic commerce card in a payment authorization request (PAReq) sent from the client 105(a) to the issuer ACS 140. A PAReq is also sometimes referred to as an authentication request message. The ACS uses the pseudonym provided by the consumer system to identify the electronic commerce card being supplied by the consumer and retrieves authentication information previously associated with the electronic commerce card. In an embodiment, the ACS matches the pseudonym received via the authentication request with the pseudonym previously created for VERes. In a further embodiment, the pseudonym expires after a limited period of time, for example five minutes, to prevent fraudulent reuse of the authentication request.

After the consumer 105 completes the authentication process, the page served in the inline authentication form may be closed. In some embodiments, a javascript command may be used to close the iFrame and submit the consumer payment information for authorization. The ACS 140 then returns a payment authentication response (PARes) to the merchant server 120. A PARes is also sometimes referred to as an authentication response message. This is shown at step 8 in FIG. 1. In one embodiment, the ACS is able to directly communicate with the merchant server 120 because the ACS is able to determine the correct merchant server from the pseudonym in the authentication request. In another embodiment, the merchant server is identified in a merchant server response URL that is stored in a variable that is passed along in the PAReq. If the authentication information provided by the consumer in the PAReq matches the authentication information previously associated with the electronic commerce card, the PARes sent to the merchant server includes a message indicating that the authentication was successful. Alternatively, the PARes can include a message indicating that the authentication failed. In a further embodiment, the PARes may also include an error code identifying the reason for authentication failure.

In addition to sending the PARes to the merchant server 110, a copy of the PARes can be sent to an authentication history server. The authentication history server may maintain an archive of all authentications performed by the system 100. The PARes is digitally signed to prevent the consumer 105 or other third parties from tampering with the contents of the PARes.

After receiving the PARes, the merchant server 120 validates the PARes. To validate the PARes, the merchant server first verifies the digital signature associated with the PARes to ensure that there has not been any tampering. Once the PARes is determined to have arrived intact, and is a response to the original PAReq, the contents of the PARes are analyzed to determine if authentication has been successful. If the authentication was not successful, the merchant server 120 may stop the transaction. If the authentication was successful, the merchant server 120 can continue with the transaction by initiating a charge to the electronic commerce card provided by the consumer 105. In an embodiment, the merchant server charges the electronic commerce card by submitting the card information to a card acquirer. The card acquirer then sends the charge request over a private card association network to be processed by the electronic commerce card issuer associated with the card. Once the charge is processed, a confirmation page can be shown to the consumer 105 on the merchant checkout page 110. This step is shown at step 9 in FIG. 1. At this point, the transaction is complete.

One skilled in the art will recognize that the steps presented and described in FIG. 1 can be altered according to various embodiments and still provide the same functionality. For example, the order in which it is determined whether a consumer's client or an issuer ACS support an inline authentication form can be switched.

The above-described method provides many technical advantages over a traditional user authentication process.

One advantage is that the possibility of dropped sessions is greatly diminished. This advantaged can be realized because the streamlined interface is not jarring to the consumer and because the implementation of the interface allows the merchant page to remain open with an active session to the merchant server. Additionally, consumers may be able to move the inline authentication form on the screen so that the consumer can view the checkout page in the background. This feature will help comfort the consumer that their order has not been lost. For example, an iFrame allows for this sort of functionality. The dynamic iFrame window also allows the window to be easily re-sized to provide a better experience to consumers, give more flexibility to issuers in their presentation, and allow for more explanations to be given to the consumers. Other mechanisms for presenting an inline authentication form may also have similar capabilities.

Another advantage is that the new interface sits on top of the existing authentication protocol as an enhancement. As a result, in order to implement the new interface, only the ACS and the merchant sites need to be modified in order to implement the new interface. These modifications can be performed independently of each other using technology that is familiar to most merchants and issuers.

Another advantage is that the interface upgrades are designed so that the upgrades can be implemented independently over time by the various entities involved in the authentication. If a particular ACS or merchant cannot support the new interface, the process can fall back to the most recent mutually-supported version.

Figure 2:
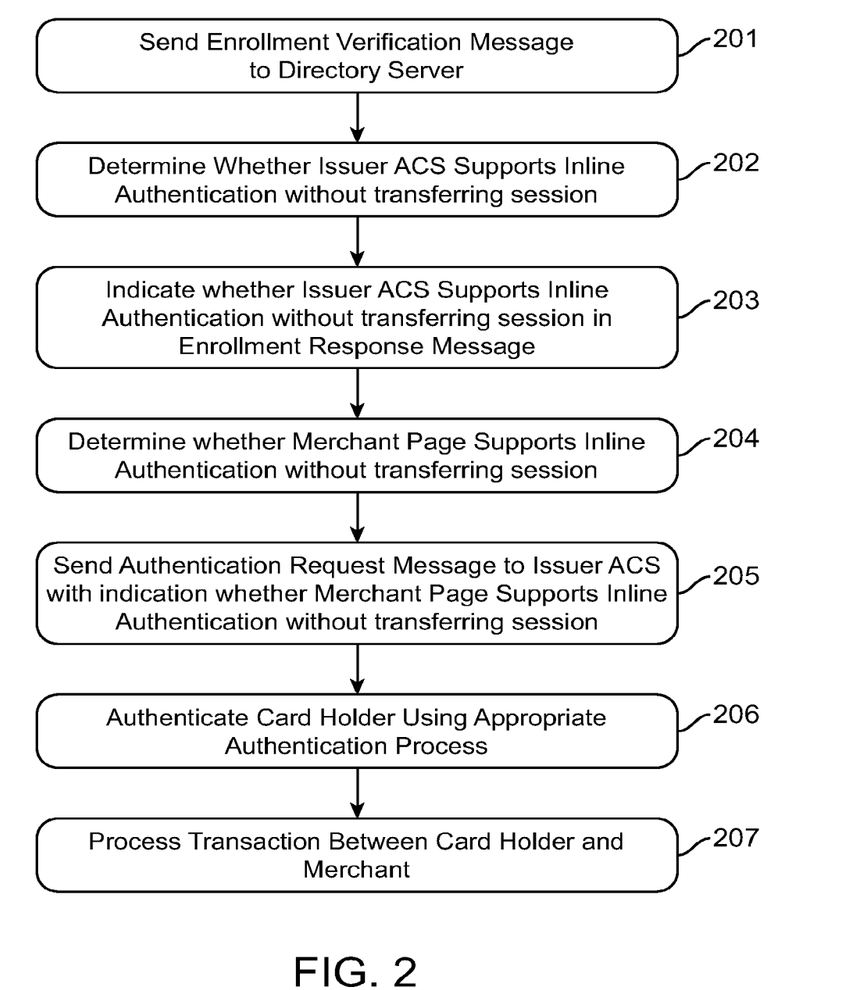
FIG. 2 shows a flow diagram illustrating the steps taken according to one embodiment.

FIG. 2 is a flow chart illustrating the steps taken according to various embodiments.

At step 201, an enrollment verification message is sent to a directory server. As mentioned previously, an enrollment verification message is a message that is sent from a merchant server to a directory server in order to determine the appropriate card issuer system that can authenticate a consumer.

At step 202, the directory server, during the course of determining the appropriate card issuer system for authentication, also determines whether the card issuer system supports inline authentication without transferring a client session.

At step 203, the determination regarding transferring a client session at step 202 is included in the enrollment verification response message sent back to the merchant server. This information can then be used by the merchant server or the merchant checkout page to help determine whether the consumer should attempt an inline authentication process without transferring a merchant client session.

At step 204, it is determined whether the consumer's client displaying the merchant's checkout page and whether the merchant's checkout page itself supports inline authentication without transferring a session.

At step 205, an authentication request message is sent to the issuer. This message includes an indication of whether the merchant's checkout page and the consumer's client can support inline authentication without transferring a client session.

At step 206, the consumer is authenticated using the appropriate method. If inline authentication without transferring a client session is supported by the merchant's checkout page, the consumer's client, and the issuer, then inline authentication can proceed without transferring the client session. For example, the authentication process can be carried out in a page contained within an iFrame opened by the merchant checkout page. If any of the merchant checkout page, the consumer's client, or the issuer do not support inline authentication without transferring a client session, a standard authentication form may be used. Regardless of the authentication process used, the merchant server is ultimately informed of outcome of authentication process.

At step 207, the transaction is processed by the merchant if the authentication was successful. If authentication was unsuccessful, the merchant can cancel the transaction or take any other appropriate action.

Figure 3:
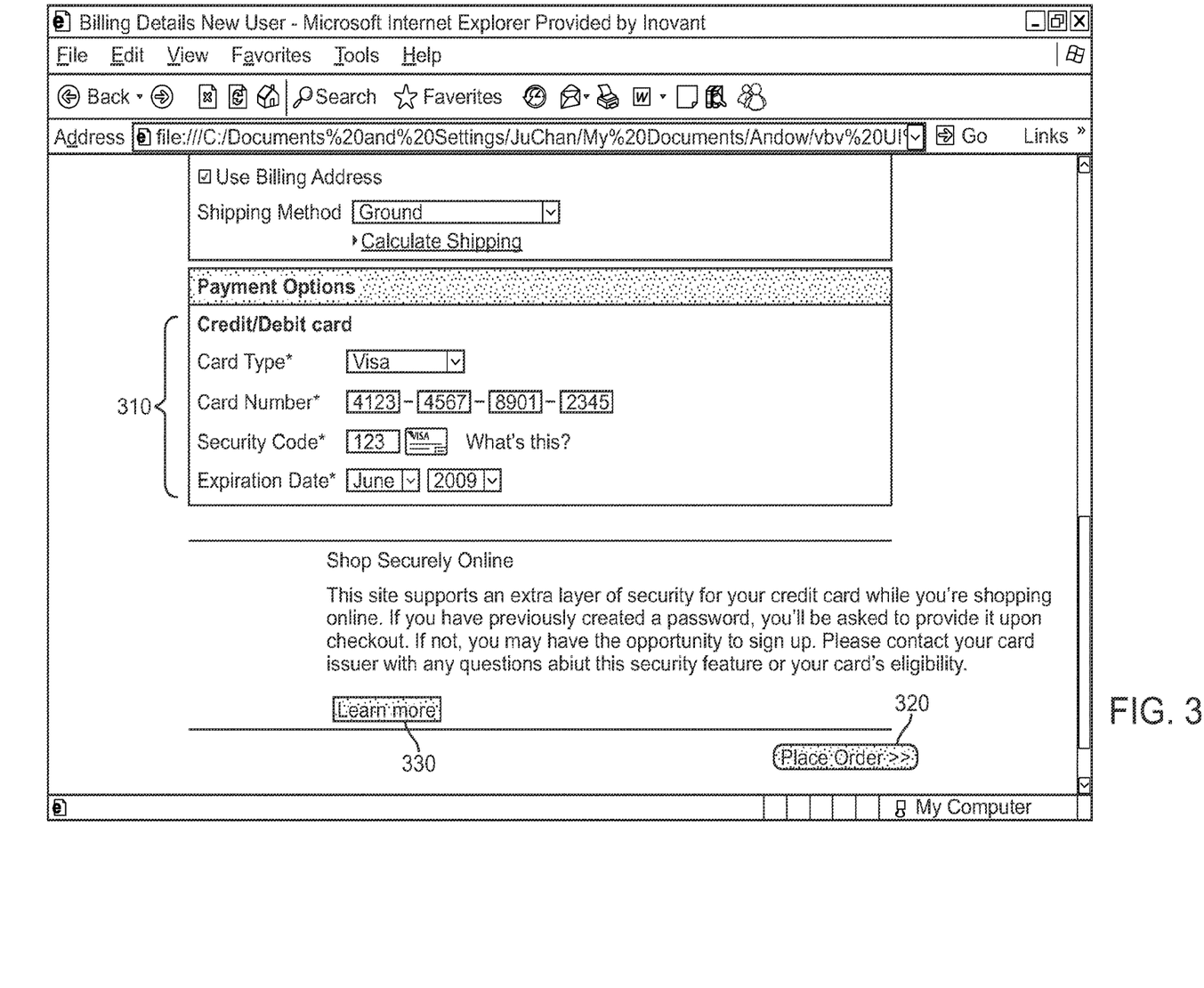
FIG. 3 shows a sample screen shot according to one embodiment.
Figure 4:
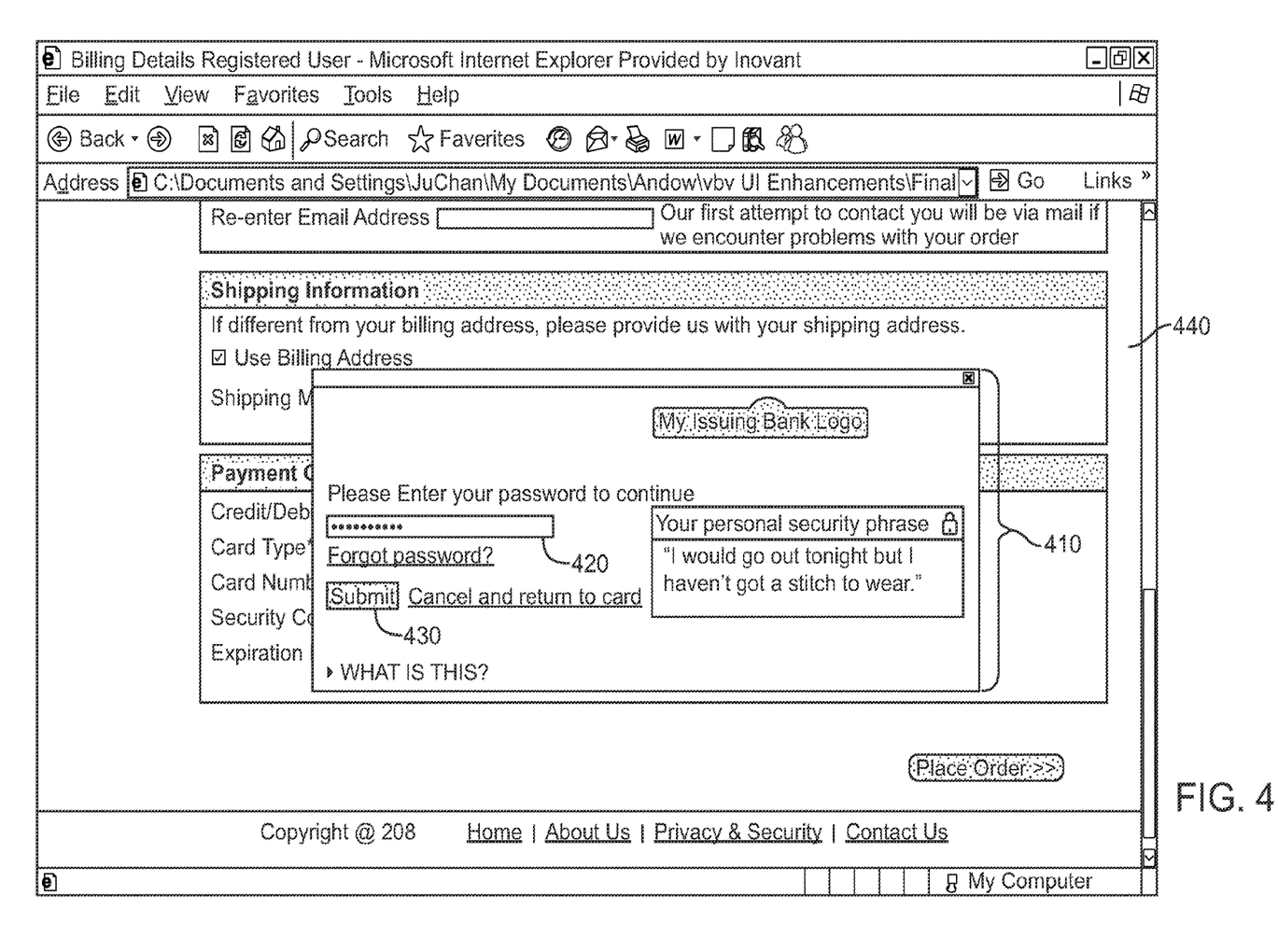
FIG. 4 shows a sample screen shot according to one embodiment.
Figure 5:
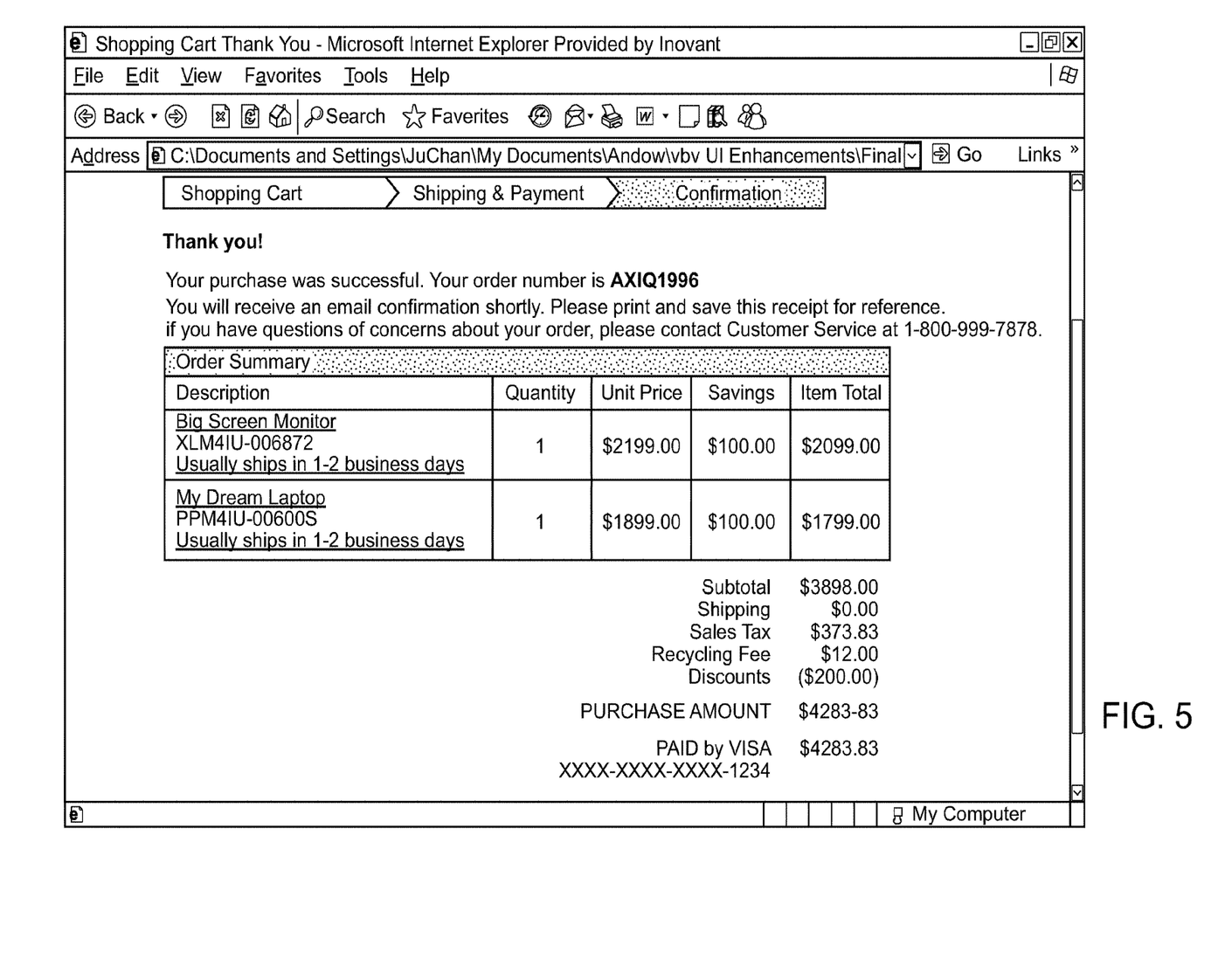
FIG. 5 shows a sample screen shot according to one embodiment.

FIGS. 3-5 show some exemplary screen shot illustrating how a consumer can be authenticated without transferring a merchant client session. These screenshots are meant to illustrate how one embodiment might implement an inline authentication process.

FIG. 3 shows a sample merchant checkout page. In FIG. 3, the consumer has filled out their consumer information in payment option fields 310. In the embodiment illustrated in FIG. 3, there are two buttons that the consumer can use to proceed. The first button is a "Learn more" button 330. This button, if clicked, may open up a new page in an iFrame to display more information on an authentication process to the consumer. The information displayed in the iFrame can be served from a server different from the merchant server. Alternatively, the consumer may click on the "Place Order" button to proceed with the order.

FIG. 4 shows a sample screen shot of a page served within an iFrame 410 that is being used to authenticate a consumer after the consumer has pressed the "Place Order" button in FIG. 3. As described earlier, the inline authentication page served within the iFrame may be served by an Issuer ACS after it has been determined that the merchant checkout page, issuer ACS, and consumer client all support inline authentication. The merchant checkout page 440 is still visible to the consumer, but the merchant checkout page has been darkened to allow it to fade into the background. iFrame 410 can be moved around on the screen so that the consumer can see the underlying information in the merchant checkout page, and the session maintained by the merchant server is still active with the merchant checkout page in the consumer's browser. In FIG. 4, the consumer has entered a previously determined password in the password field 420. In other embodiments, other identifying information may be requested from the consumer in addition to or instead of a password. If the consumer has not previously established a password, then the inline authentication form can be used to register the consumer's account to be used within the authentication system. The registration process can proceed in a window similar to the one shown in the iFrame in FIG. 4.

FIG. 5 shows a sample confirmation page after a consumer has been authenticated. As previously described, after the consumer has submitted their authentication information in an inline form such as the one illustrated in FIG. 4, the Issuer ACS may send an authentication response to the merchant server with the result of the authentication attempt. If the authentication was successful, the merchant may proceed with the order and ultimately display a confirmation page, such as the one illustrated in FIG. 5. The screen shown in FIG. 5 indicates to the consumer that the order has been successfully processed.

Figure 6:
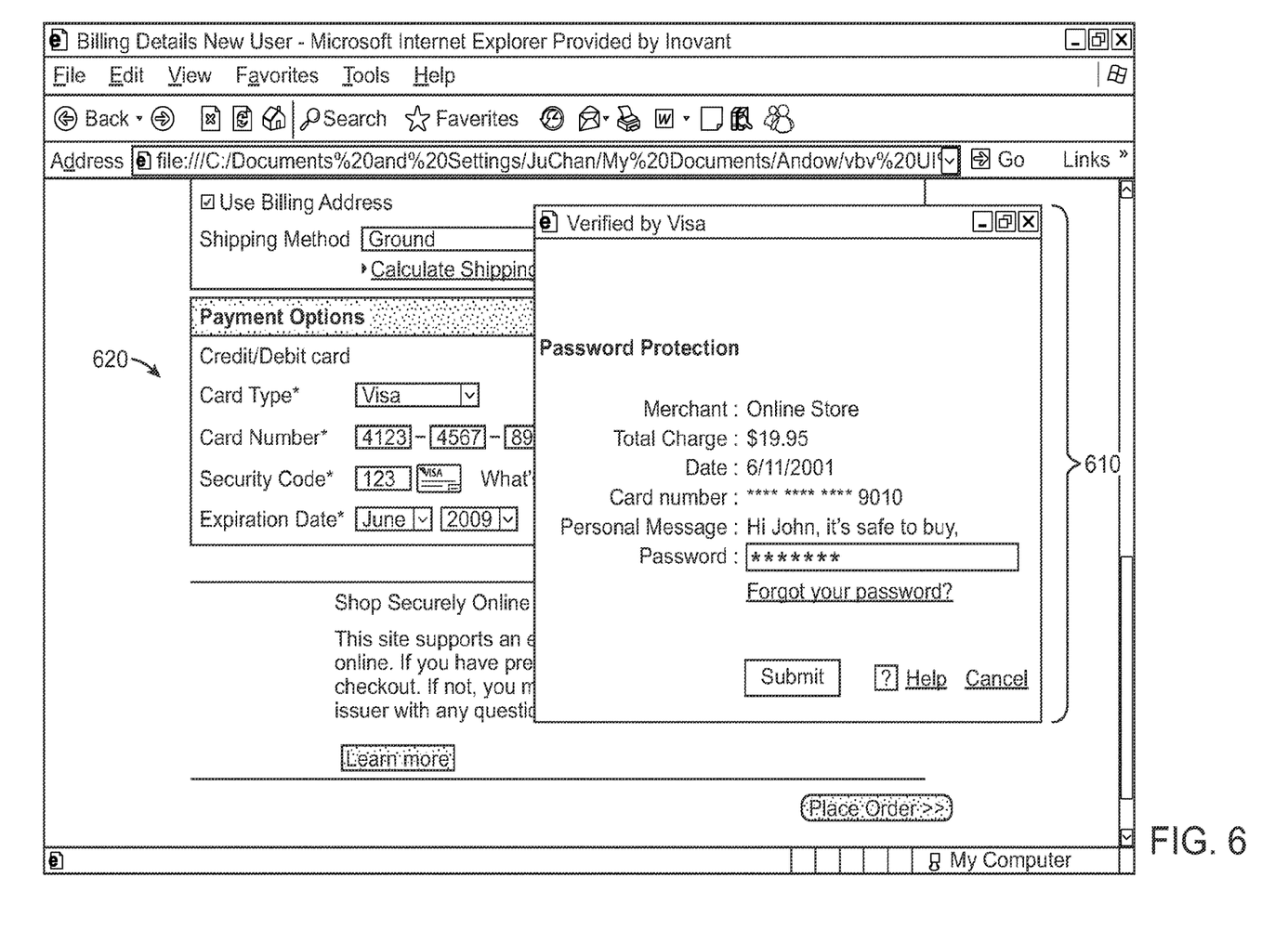
FIG. 6 shows a sample screen shot according to one embodiment.

FIG. 6 shows a sample screen shot of one version of a standard authentication form. As previously described, if a merchant checkout page, issuer ACS, or consumer client do not support inline authentication, then the authentication system will typically fallback to a standard authentication form. In FIG. 6, a pop-up window 610 has been opened by the merchant checkout page 620. Like an inline authentication form opened in an iFrame, the pop-up window can be moved around the screen to reveal the information in the merchant checkout page. However, the merchant checkout page has not been darkened. Additionally, depending on the client used by the consumer to view the merchant checkout page, it may not be possible to open the pop-up window at all.

Figure 7:
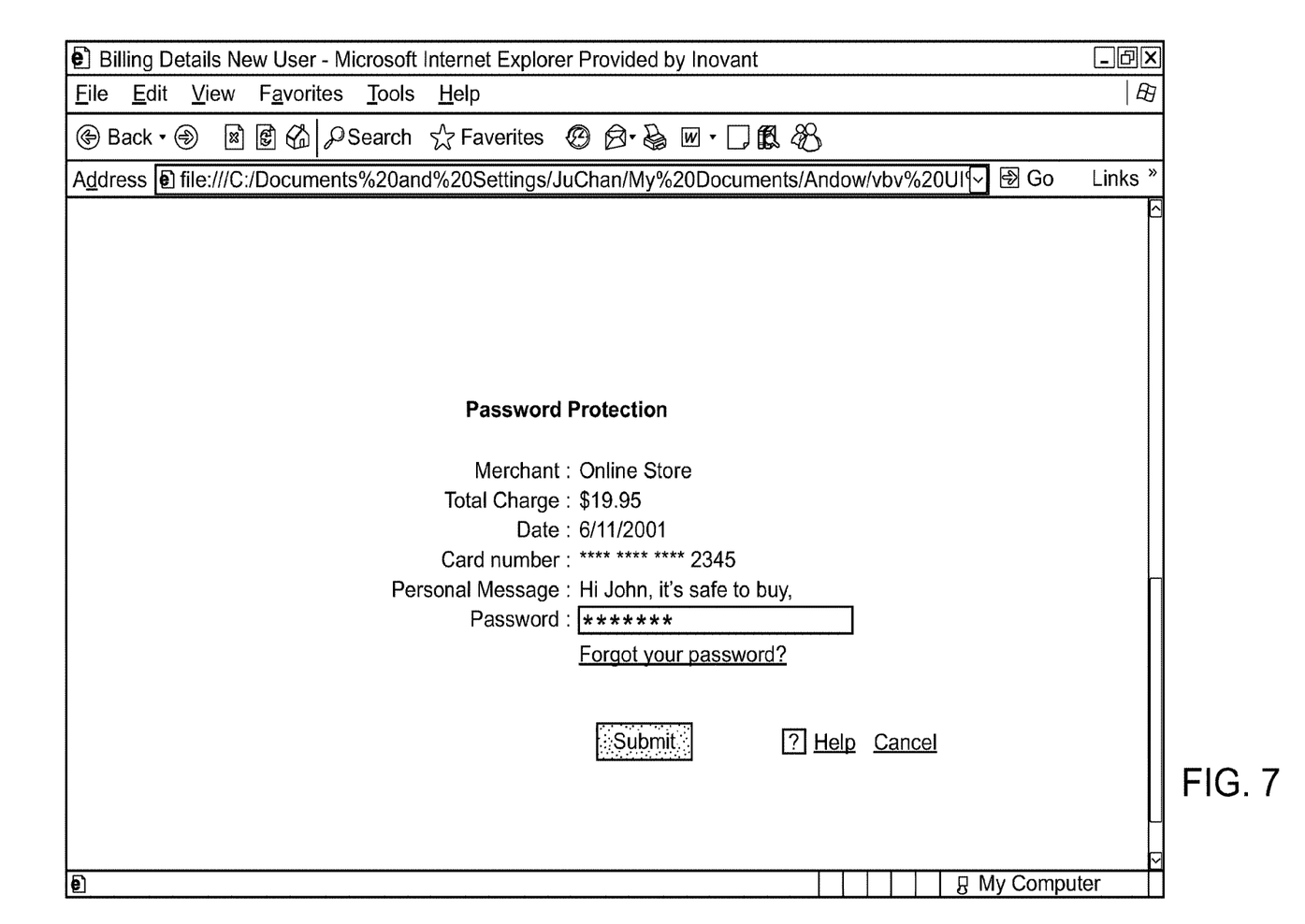
FIG. 7 shows a sample screen shot according to one embodiment.

FIG. 7 shows another sample screen shot of one version of a standard authentication form. In FIG. 7, a page similar to the page shown in pop-up window 610 is shown to the consumer, but the page has been opened in place of a merchant checkout page. A consumer cannot see the original merchant checkout page while going through the authentication process. As explained earlier, this interface may be unsettling to the consumer; however, if the merchant checkout page, issuer ACS, or consumer client do not support inline authentication, then a standard authentication form such as the one illustrated in FIG. 7 can be used.

Figure 8:
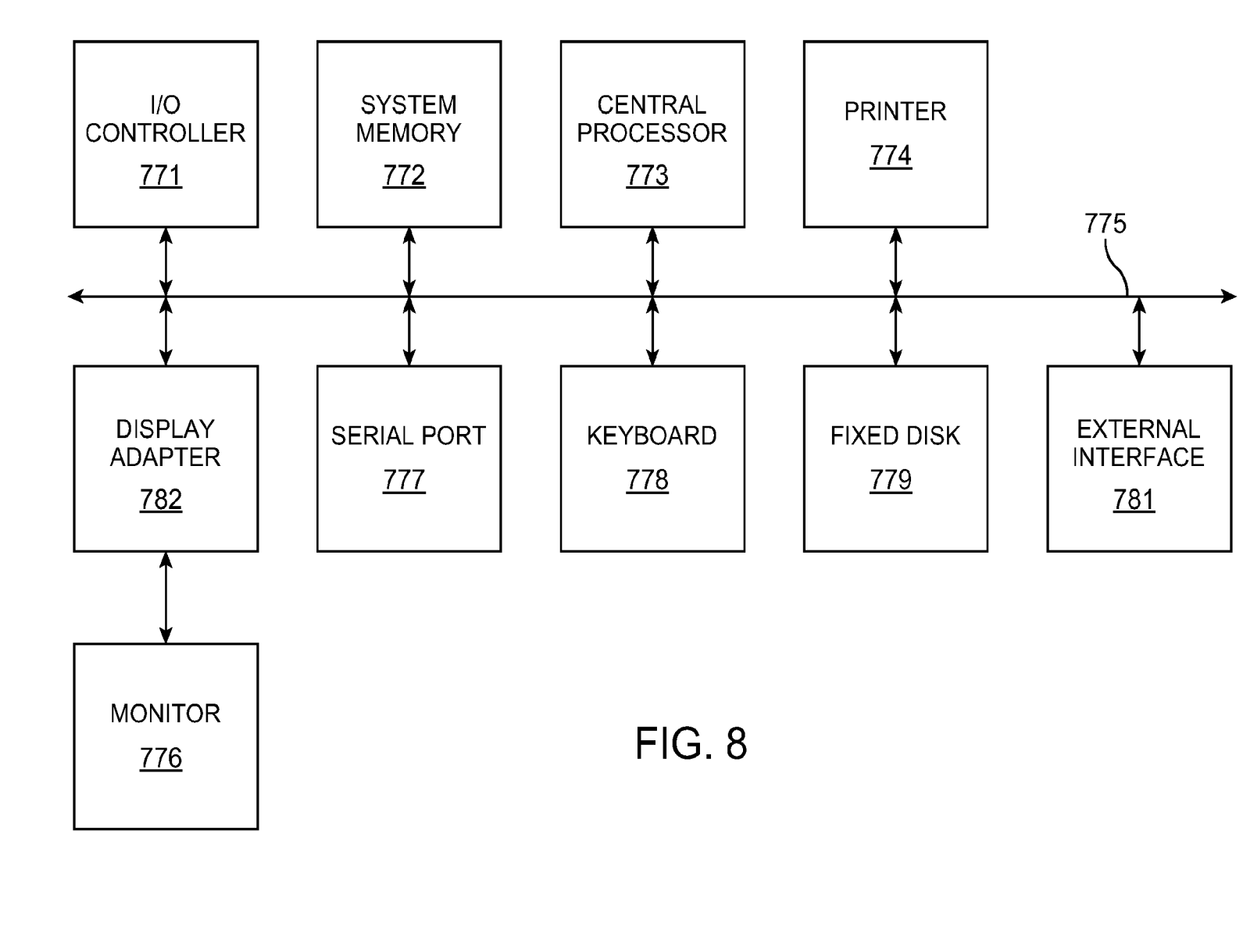
FIG. 8 shows an block diagram of an exemplary computer apparatus.

The various participants and elements in FIG. 1, such as the client computer 105(*a*), merchant server 120, directory server 130, and Issuer ACS 140, may operate one or more computer apparatuses to facilitate the functions described herein. Any of the elements in FIG. 1 may use any suitable number of subsystems to facilitate the functions described herein. Examples of such subsystems or components are shown in FIG. 8. The subsystems shown in FIG. 8 are interconnected via a system bus 775. Additional subsystems such as a printer 774, keyboard 778, fixed disk 779 (or other memory comprising computer readable media), monitor 776, which is coupled to display adapter 782, and others are shown. Peripherals and input/output (I/O) devices, which couple to I/O controller 771, can be connected to the computer system by any number of means known in the art, such as serial port 777. For example, serial port 777 or external interface 781 can be used to connect the computer apparatus to a wide area network such as the Internet, a mouse input device, or a scanner. The interconnection via system bus allows the central processor 773 to communicate with each subsystem and to control the execution of instructions from system memory 772 or the fixed disk 779, as well as the exchange of information between subsystems. The system memory 772 and/or the fixed disk 779 may embody a computer readable medium.

A computer readable medium according to an embodiment may comprise code for performing any of the functions described above. For example, the steps discussed in relation to FIG. 1 or FIG. 2 may all be contained in one or more computer readable media.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

A recitation of "a", "an" or "the" is intended to mean "one or more" unless specifically indicated to the contrary.

The above description is illustrative and is not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents.

One or more features from any embodiment may be combined with one or more features of any other embodiment without departing from the scope of the disclosure.

All patents, patent applications, publications, and descriptions mentioned above are herein incorporated by reference in their entirety for all purposes. None is admitted to be prior art.

What is claimed is:

1. A method comprising:
   sending a payment message over a network to a merchant server from a merchant checkout page, wherein the payment message includes electronic commerce account information for an electronic commerce account and wherein the payment message includes an indication that the merchant checkout page is configured to support an inline authentication form, wherein the merchant server determines that the merchant checkout page is configured to support the inline authentication form based on the indication that the merchant checkout page is configured to support the inline authentication form;
   receiving a payment message response from the merchant server at the merchant checkout page, wherein the payment message response includes an indication that an issuer server associated with the electronic commerce account supports inline authentication;
   determining, based on the indication that the issuer server supports inline authentication, that the issuer server supports inline authentication;
   based on the determination that the merchant checkout page is configured to support the inline authentication form and the determination that the issuer server supports inline authentication, displaying the inline authentication form; and
   sending, via the inline authentication form, an authentication request message to the issuer server from the merchant checkout page to conduct an online transaction between a merchant and a consumer,
   wherein the issuer server sends to the merchant server an authentication response message, wherein the authentication response message includes an indication of whether the consumer was successfully authenticated by the issuer server.

2. The method of claim 1, wherein the inline authentication form is an i-Frame.

3. The method of claim 1, wherein the payment message is sent to the merchant server using SSL.

4. The method of claim 1, wherein the payment message response comprises a URL for the issuer server.

5. The method of claim 1, wherein the authentication request message includes an indication of whether the merchant checkout page is configured to support the inline authentication form when the issuer server is configured to authenticate the consumer using the inline authentication form.

6. The method of claim 1, wherein the electronic commerce account information comprises a card number and an expiration date.

7. The method of claim 1, further comprising:
   receiving an indication that a payment was processed by the merchant server.

8. The method of claim 1, further comprising:
   providing authentication information to the issuer server.

9. The method of claim 1, wherein the authentication request message includes an indication that the merchant checkout page can support the inline authentication form.

10. The method of claim 1, further comprising:
    providing authentication information comprising a password and a pseudonym to the issuer server.

11. A client computer comprising:
    a processor, and a computer readable medium coupled to the processor, the computer readable medium comprising code for implementing a method comprising:
    sending a payment message over a network to a merchant server from a merchant checkout page, wherein the payment message includes electronic commerce account information for an electronic commerce account and wherein the payment message includes an indication that the merchant checkout page is configured to support an inline authentication form, wherein the merchant server determines that the merchant checkout page is configured to support the inline authentication form based on the indication that the merchant checkout page is configured to support the inline authentication form;
    receiving a payment message response from the merchant server at the merchant checkout page, wherein the payment message response includes an indication that an issuer server associated with the electronic commerce account supports inline authentication;
    determining, based on the indication that the issuer server supports inline authentication, that the issuer server supports inline authentication;

based on the determination that the merchant checkout page is configured to support the inline authentication form and the determination that the issuer server supports inline authentication, displaying the inline authentication form; and sending, via the inline authentication form, an authentication request message to the issuer server from the merchant checkout page to conduct an online transaction between a merchant and a consumer, wherein the issuer server sends to the merchant server an authentication response message, wherein the authentication response message includes an indication of whether the consumer was successfully authenticated by the issuer server.

12. The client computer of claim 11, wherein the inline authentication form is an i-Frame.

13. The client computer of claim 11, wherein the payment message is sent to the merchant server using SSL.

14. The client computer of claim 11, wherein the payment message response comprises a URL for the issuer server.

15. The client computer of claim 11, wherein the authentication request message includes an indication of whether the merchant checkout page is configured to support the inline authentication form when the issuer server is configured to authenticate the consumer using the inline authentication form.

16. The client computer of claim 11, wherein the electronic commerce account information comprises a card number and an expiration date.

17. The client computer of claim 11, wherein the method further comprises:

receiving an indication that a payment was processed by the merchant server.

18. The client computer of claim 11, wherein the method further comprises:

providing authentication information to the issuer server.

19. The client computer of claim 11, wherein the authentication request message includes an indication that the merchant checkout page can support the inline authentication form.

20. The client computer of claim 11, wherein the method further comprises:

providing authentication information comprising a password and a pseudonym to the issuer server.

* * * * *